June 24, 1952 A. ELLETT 2,601,505

SUBSCRIPTION TYPE TELEVISION TRANSMITTER

Filed March 23, 1949 3 Sheets-Sheet 1

ALEXANDER ELLETT
INVENTOR.

BY Bruce L. Buchef

HIS AGENT

June 24, 1952 A. ELLETT 2,601,505

SUBSCRIPTION TYPE TELEVISION TRANSMITTER

Filed March 23, 1949 3 Sheets-Sheet 2

ALEXANDER ELLETT
*INVENTOR.*

BY [signature]

HIS AGENT

ALEXANDER ELLETT
*INVENTOR.*

BY Bruce L Birchard

HIS AGENT

Patented June 24, 1952

2,601,505

UNITED STATES PATENT OFFICE 2,601,505

SUBSCRIPTION TYPE TELEVISION TRANSMITTER

Alexander Ellett, River Forest, Ill., assignor to Zenith Radio Corporation, a corporation of Illinois Application March 23, 1949, Serial No. 83,029

7 Claims. (Cl. 178—5.1)

The present invention relates, in general, to a subscription type television transmitter and is particularly directed to such a transmitter for deriving program information from a continuous film strip. The expression "subscription type television transmitter" as used herein is intended to define a transmitter for radiating a coded or scrambled television signal that is not susceptible to intelligible image reproduction by conventional receivers unless such receivers are controlled in accordance with a decoding schedule corresponding to that employed in the transmitter.

Subscription type television systems similar to that to be described are disclosed and claimed in copending application Serial Number 742,374 filed on April 18, 1947, in the name of Alexander Ellett et al., which has now issued as Patent No. 2,510,046, May 30, 1950, and copending application Serial Number 773,848 filed September 13, 1947, now Patent No. 2,547,598, granted April 3, 1951, in the name of Erwin M. Roschke, both of which are assigned to the same assignee as the present invention. In the systems featured in those applications, coding of the transmitted signal is accomplished by altering, during spaced operating intervals, some operating characteristic of the transmitter which is manifested in the composite radiated signal. For example, by periodically injecting a delay between the line-trace interval of the video-frequency signal generator and the horizontal-synchronizing signal components, the relation of the video and horizontal synchronizing portions of the radiated signal may be changed from time to time from the time relation normally established in commercial television transmission. Similarly, periodic reversal of the direction of either the horizontal or vertical trace in the video-frequency generator causes the composition of the radiated signal to deviate from its usul form. Obviously, a conventional receiver responding to such a scrambled or coded transmission produces a picture that is both unintelligible and very uncomfortable to an observer unless compensating variations are introduced into the operation of the receiver to decode the received signal.

While there are several methods for exercising control of the receiver in order to accomplish decoding, a relatively simple method may be practiced by including in the receiver a coding arrangement generally similar to that utilized at the transmitter and by controlling the coding arrangement in accordance with a key signal supplied to the receiver from the transmitter by way of a line circuit, such as an ordinary telephone line. The key signal supplied to the receiver has amplitude variations or other characteristic variations which represent the coding schedule employed at the transmitter and which initiate a compensating coding function at the receiver to permit intelligent use of the received coded television signal. Moreover, the use of the line circuit enables a selective dissemination of the key signal so that the radiated program information is used exclusively by those receivers which have subscribed to the program service.

The present invention is concerned with a subscription system in which coding is accomplished even though the customary components of the television transmitter function in their usual fashion during each subscription program interval. The system makes use of a film as the source of program information and the film per se is coded in accordance with a prescribed schedule, whereby scanning of the film in the conventional manner results in the transmission of a coded signal.

It is an object of the present invention to provide a novel subscription type television transmitter for deriving program information from a film strip conveying such information in a coded form.

It is another object of the present invention to provide a subscription type television transmitter for utilizing a coded film strip and including a novel arrangement for deriving a decoding key representing the coding schedule of the film.

A subscription type television transmitter, in accordance with the instant invention, is adapted to transmit coded television signals representing successive frames of a film strip on which program information is recorded in at least two different modes determined by a prescribed coding schedule. The transmitter comprises a video-frequency signal generator including a film scanner for scanning successive frames of the film. There is a scanning signal generator provided which may control the film scanner to effect scanning of the film in the usual way and which produces synchronizing signals representing the scanning cycles of the transmitter. A mixer amplifier is coupled to the video-frequency generator and to the synchronizing-signal generator, this amplifier functioning to develop a coded composite television signal including both video-frequency and synchronizing-signal components. There are means, such as an antenna system, for transmitting the composite signal to subscriber receivers over one signal path or channel. The transmitter further includes a key signal generator as well as control means for controlling that generator in accordance with the coding schedule of the film to produce a key signal having characteristic variations representing the change in mode of the program information recorded on the film. Finally, means, such as a line circuit, are provided for supplying the key signal to subscriber receivers.

In one practical embodiment of the invention, the film strip carries a code record in addition to the program information and the control of the key signal generator is exercised by a scanning device which effectively reads or senses the code record.

For a better understanding of the present invention, together with the other and further objects thereof, reference is had to the following description taken in connection with the accompanying drawings and its scope will be pointed out in the appended claims.

In the drawings,

Fig. 1 is a schematic representation of a subscription type television transmitter embodying the present invention in one form;

Figs. 2*a*–2*c*, inclusive, comprise representations of a film strip used in explaining the operation of the film-scanning device.

Figure 1:
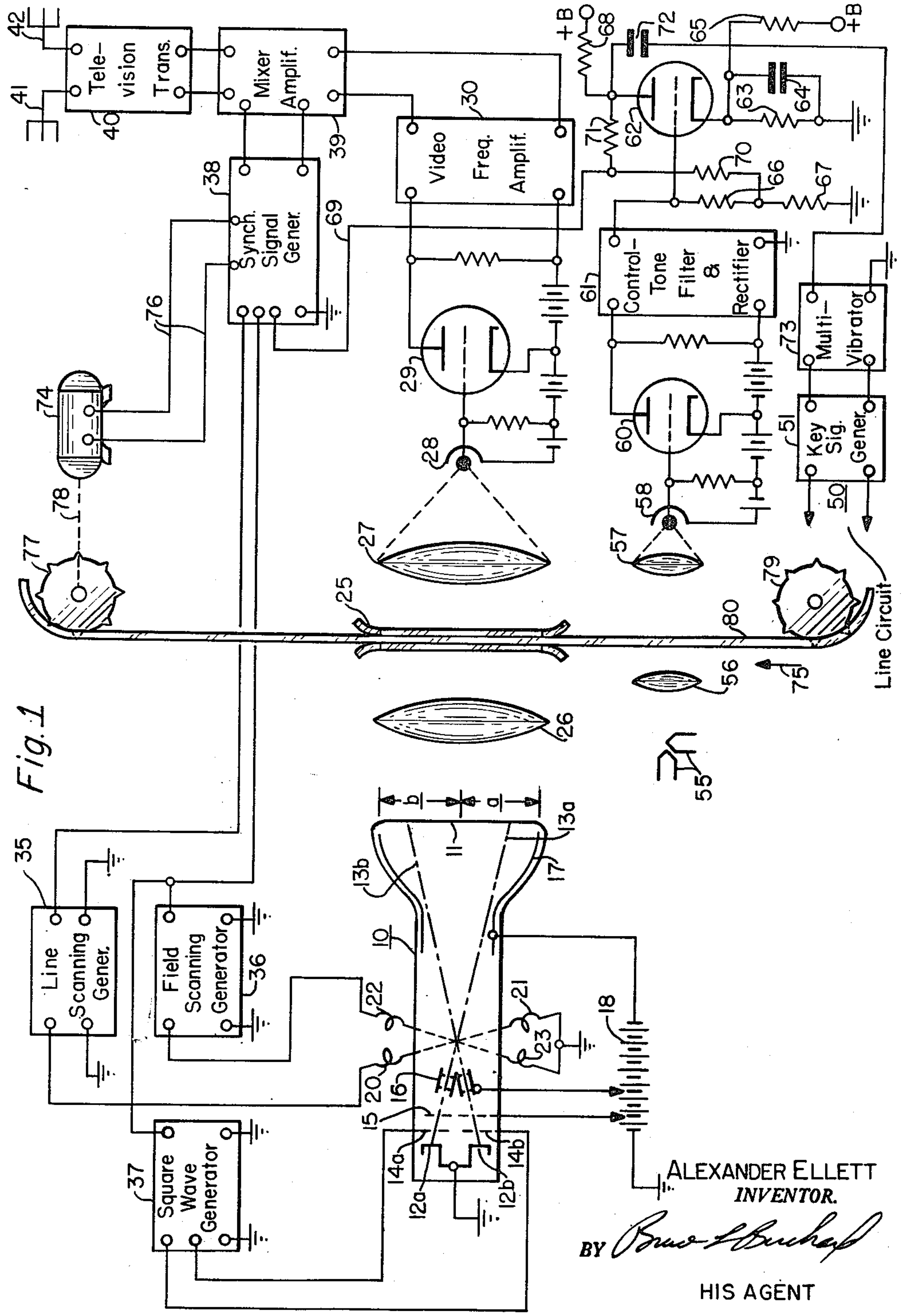

Referring now more particularly to Fig. 1, the arrangement there illustrated is a subscription type television transmitter for transmitting coded television signals representing successive frames of a film strip on which program information is recorded in at least two different modes in accordance with a coding schedule. The definition of a film strip having program information recorded in different modes will be made clear hereinafter but, for the moment, it is sufficient to understand that such a strip is a coded record of a program. The transmitter comprises a video-frequency signal generator including a film scanner for scanning successive frames of a film. This scanner may take any of a variety of forms presently known to effect film scanning, such as a Nipkow disc, an image dissector tube, the so-called "flying-spot" scanner, or the like. For the purpose of a specific disclosure, the embodiment of Fig. 1 is shown as including a flying-spot scanner.

In general, a flying-spot scanner is a device which produces a spot or point of light that is deflectible in a bi-dimensional pattern across a film positioned within a scanning area such as a film gate. As shown, the flying-spot is produced in a cathode-ray tube 10 having a white screen 11 which may be considered as including two contiguous screen sections represented by the dimension lines *a* and *b*. These sections have the same horizontal and vertical dimensions. In order to accomplish double-interlaced scanning, which is largely employed in present-day television transmitters, the tube 10 includes two separate electron guns comprising cathodes 12*a* and 12*b* for supplying a pair of electron beams represented by the dash-dot lines 13*a* and 13*b*. Each of these beams is utilized to scan one of the screen sections *a*, *b*. Separate control electrodes 14*a* and 14*b* are associated with the cathodes 12*a* and 12*b*, respectively, while suitable first and second accelerating anodes 15 and 16, respectively, are common to both of the cathodes. A common anode 17 is included within the tube and suitable operating potentials are supplied from a source of uni-directional potential shown as a battery 18.

Beam-deflecting elements are disposed adjacent a portion of the tube neck in which the electron beams cross to facilitate subjecting each beam to the same scanning fields so that the screen sections *a* and *b* are scanned in essentially identical bi-dimensional scanning patterns. While the deflection system of the tube may be of the electrostatic or the electromagnetic type, the latter has been represented and includes line-scanning windings 20, 21 and field-scanning windings 22, 23.

In front of the tube 10 there is the customary film gate 25 and a lens system shown schematically at 26, 27 serves to focus the spot from the tube to the film gate and to collect light transmitted by the film to direct that light to a conventional photoelectric cell 28. The output terminals of the photoelectric cell are connected to a first amplifier including a triode vacuum tube 29 with which there is connected a further video-frequency amplifier 30 having any desired number of stages.

The transmitter further includes a scanning-signal generating system for controlling the electron beams of the film scanner 10 and for producing synchronizing signals representing the scanning cycles of the film scannner. This generating system includes a line-scanning generator 35 and a field-scanning generator 36 coupled, respectively, with windings 20, 21 and 22, 23. A synchronizing-signal generator 38 of conventional construction supplies the usual synchronizing signals to the scanning generators. It also supplies the field-synchronizing signals to a square-wave generator 37 so that the operating frequency of that generator corresponds with the field frequency. The square-wave generator is considered to have a pair of output terminals where square-wave signals of mutually opposite polarity or phase are available. One of these terminals is connected with the control electrode 14*a* and the other is connected with control electrode 14*b* of the tube 10 to permit the electron beams of the tube to be energized in alternation.

A mixer amplifier 39 has input terminals coupled to the output terminals of the video-frequency amplifier 30 and to output terminals of the synchronizing-signal generator 38 to develop a composite television signal. The output circuit of the mixer amplifier 39 is coupled to a television transmitter 40 including a carrier wave signal supply and a modulator. The output terminals of the transmitter 40 connect with an antenna system 41, 42 which constitutes means for transmitting the composite signal to subscriber receivers over a first signal channel, namely, an ether link.

To permit a subscriber receiver to utilize the coded television transmission, a second signal channel, shown as a line circuit 50, extends from the transmitter under consideration and may be connected through any suitable distribution system, such as a telephone system, to the subscriber receiver. A key-signal generator 51 is provided having output terminals coupled to the line circuit 50. Where the line circuit is a component of a telephone system, the key-signal generator may be an oscillator producing a key signal that is super-audible yet of a frequency sufficiently low for efficient transmission over this system.

The transmitter of Fig. 1 further includes means for controlling the key-signal generator in accordance with the coding schedule of the film being scanned so that the key-signal produced by this generator has characteristic variations, such as amplitude variations, representing changes in mode of the program record on the film being scanned. This control means for the key-signal generator may, of course, be any suitable coding device coupled to the key-signal generator and having portions representing the code schedule. For example, a code wheel having peripheral portions representing the coding schedule of the film is suitable for turning the key-signal generator off and on during spaced operating intervals but it is convenient and facilitates the installation to provide a code record in strip form representing the coding schedule of the film. Preferably, the code record is integrated with the film and a second scanning device reads or senses the code strip to develop a control signal for use in determining the on and off operating intervals of the key-signal generator 51.

The scanning device for reading the code strip includes a light source 55, a lens system 56, 57 and a photocell 58 arranged so that light from the source 55 may scan a code strip of the film to energize the photocell. An amplifier, including a triode vacuum tube 60, and a control tone filter and rectifier 61 are connected in cascade with the output terminals of the photocell 58. While the output signal of unit 61 may be utilized directly to control the key-signal generator 51, it is desirable to permit the operating conditions of the key-signal generator to be changed during field-retrace intervals because the coded record film in most instances has code components which endure for an integral number of film frames. Consequently, the output circuit of unit 61 is connected to the control electrode-cathode circuit of a triode vacuum tube 62 having a cathode connected to ground through a biasing network comprising a resistor 63 and a shunt condenser 64. The high-potential terminal of the parallel connected elements is connected through an isolating resistor 65 to a source of unidirectional potential indicated +B. This biasing network normally biases the tube 62 to cut off. The control electrode of the tube is connected to ground through series resistors 66 and 67 while the anode thereof is connected to a source of energizing potential +B through a load resistor 68. Vertical synchronizing or, preferably, vertical blanking pulses are supplied to the tube 62 by way of a connection 69 from a field-blanking output terminal of the synchronizing-signal generator 38 and through an isolating resistor 70. Moreover, there is a direct connection from the conductor 69 through a resistor 71 to the anode electrode of the tube 62 provided for a purpose to be made clear in describing the operation of the key-signal generating system. The output circuit of the tube 62 is coupled through a condenser 72 to the input circuit of a "single-shot" multivibrator 73, that is, a multivibrator or trigger circuit in which applied signals of one polarity condition the unit in one sense whereas applied signals of the opposite polarity condition the unit in the opposite sense. The output terminals of the multivibrator are directly connected to a control circuit included in the key-signal generator 51.

To permit scanning of successive frames of the film and to permit reading of the code strip carried by the film, a driving mechanism including a motor 74 is provide for continuously driving the film in the direction indicated by the arrow 75. The motor 74 is coupled to the synchronizing-signal generator 38 as indicated by the connection 76 to synchronize the drive with the field frequency. A take-up sprocket 77 is mechanically coupled to the motor as indicated by the broken construction line 78 and the film may be guided by an idler roller 79 positioned on the opposite side of the film gate 25.

Figures 2A, 2B, 2C:
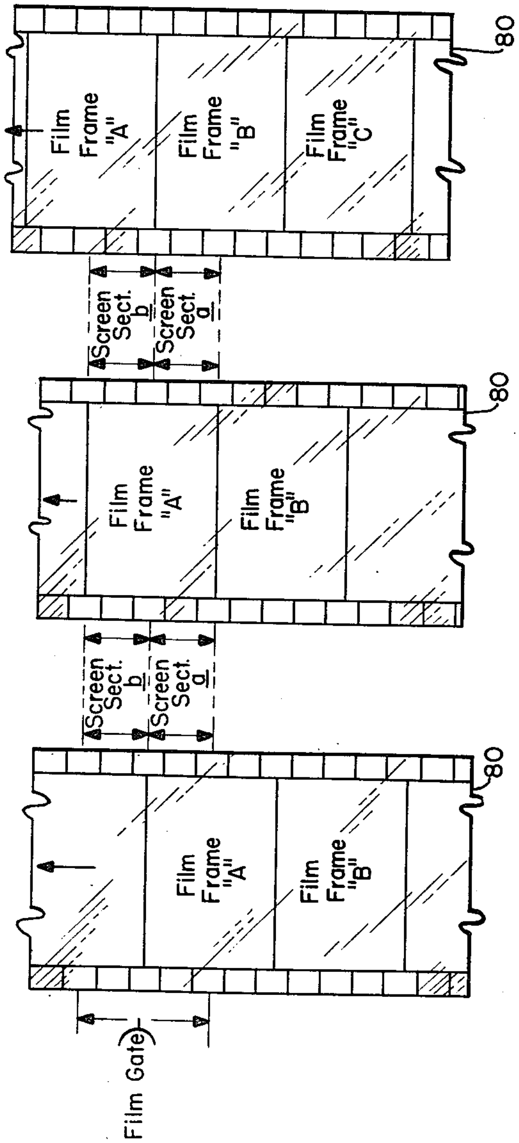

In considering the operation of the described transmitting system, it will be helpful initially to disregard all of the coding aspects and consider simply the method of accomplishing double-interlaced film scanning. In explanatory Figs. 2*a*–2*c* there is represented a sequence of positions of a continuously moving film 80 relative to the film gate 25. Fig. 2*a* depicts a condition in which a particular film frame A is midway of the film gate in its vertical travel. At that operating instant, the square wave output of generator 37 energizes electron beam **13*a* and extinguishes the alternate beam 13*b*. For the next succeeding field interval, the electron beam 13*a*** scans a series of horizontal lines on the screen section *a* and on the corresponding area of the film gate, these lines progressing from the uppermost portion of the screen section vertically downward. If the film 80 is moving vertically upward at the field rate, the trailing edge of the frame A enters the film gate at the end of the field scan executed by the beam **13*a***, as shown in Fig. 2*b*. In other words, the beam **13*a* completely scans one field of the frame A. In the next field interval of the transmitter, generator 37 extinguishes the beam 13*a* and enables the cathode 12*a* to produce the alternate beam 13*b*. The direction of field trace is the same for the electron beams and therefore the beam 13*b*** commences its scan at the leading edge of the film frame A. At the end of the particular field, the trailing edge of the frame A is halfway through the film gate as represented in Fig. 2*c* and thus the beam **13*b* has effected a complete field scan of the film frame. Consequently, the frame A is scanned twice and, through the conventional adjustments of the scanning generators, the two fields scanned by the two electron beams of the tube 10 are interlaced. In this manner, successive frames of the film strip 80** are scanned in accordance with the conventional double-interlaced pattern.

During any field scan of the tube 10 shade variations of the particular frame within the scanned portion of the film gate cause signal variations in the circuit of the photoelectric cell 28 corresponding to the variations of light and shade values in that frame. Thus, a video-frequency signal is developed and supplied to the mixer amplifier 39 where it is combined with the horizontal and vertical-synchronizing components to develop the usual composite television signal. The composite signal is modulated on a suitable carrier wave in unit 40, and is radiated from antenna 41, 42.

Figure 3:
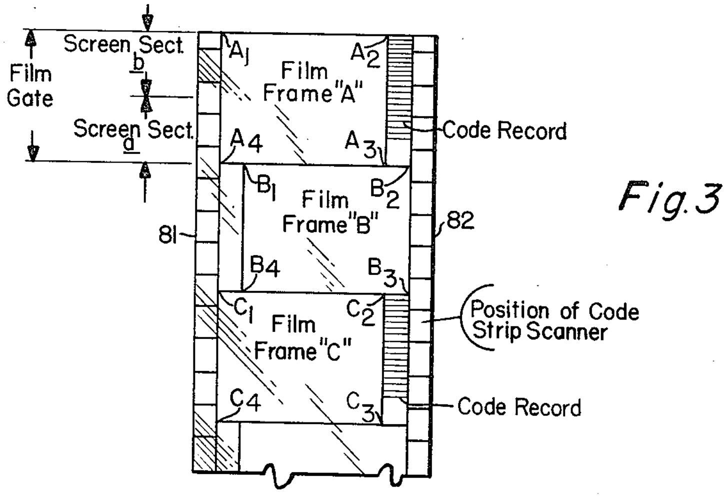
Fig. 3 represents a coded film strip of the type which may be utilized with the transmitter of Fig. 1.

In practicing the present invention, the described operation of the transmitter is not modified to introduce the coding feature. Rather, coding is accomplished through the use of a coded film as previously indicated. A portion of such a coded film is represented in Fig. 3 in which the picture or program information of the film frame A is included within the rectangle designated $A_1$—$A_4$. In the succeeding frame B, the program information is encompassed within the rectangle designated $B_1$—$B_4$, while the third frame has its program information within the rectangle $C_1$—$C_4$. It is apparent, upon inspection, that the program information of frame B is laterally displaced to the right relative to the information on its neighboring frames A and C. It will be assumed, merely for the purposes of explanation, that every other frame of the film strip is positioned as represented by the frames A and C, but that the intervening frames are relatively displaced, having a position on the strip corresponding to that of the frame B. In other words, succeeding frames are laterally displaced relative to one another.

In conventional film recording, a given point of a subject occupies the identical position in succeeding frames and has in each frame the same shade value, assuming of course that there is no modification of the subject as between the several frames which are compared. Frames A and frames C are recorded in accordance with that method, whereas the intermediate frames are laterally displaced relative thereto, as already described. For the sake of definition, it can be said that the frames A and C represent a film recording of one mode and frame B represents a recording in a different mode since a given point of a common subject does not have the same position in the frame B that it has in frames A and C. Thus, the film is defined herein and in the appended claims as having program information recorded in at least two different modes in accordance with a coding schedule. For the assumed case, the schedule is an alternation between these modes from one frame to the next.

Obviously, the width of the film strip between the peripheral portions 81 and 82 which accommodate the driving apertures must be sufficient to permit periodic lateral displacement of the film frames. For that reason, there is a space to the right of the frame A which may convey the code record. All frames positioned as frame A on the strip may likewise be accompanied by a code record as shown in Fig. 3. Here, the code is a series of horizontal lines having a vertical separation such that their scanning by the system 55—58, in view of the motion of the film, causes the photocell 58 to generate a control tone of a preassigned frequency represented by the vertical separation of the code lines.

Figure 4:
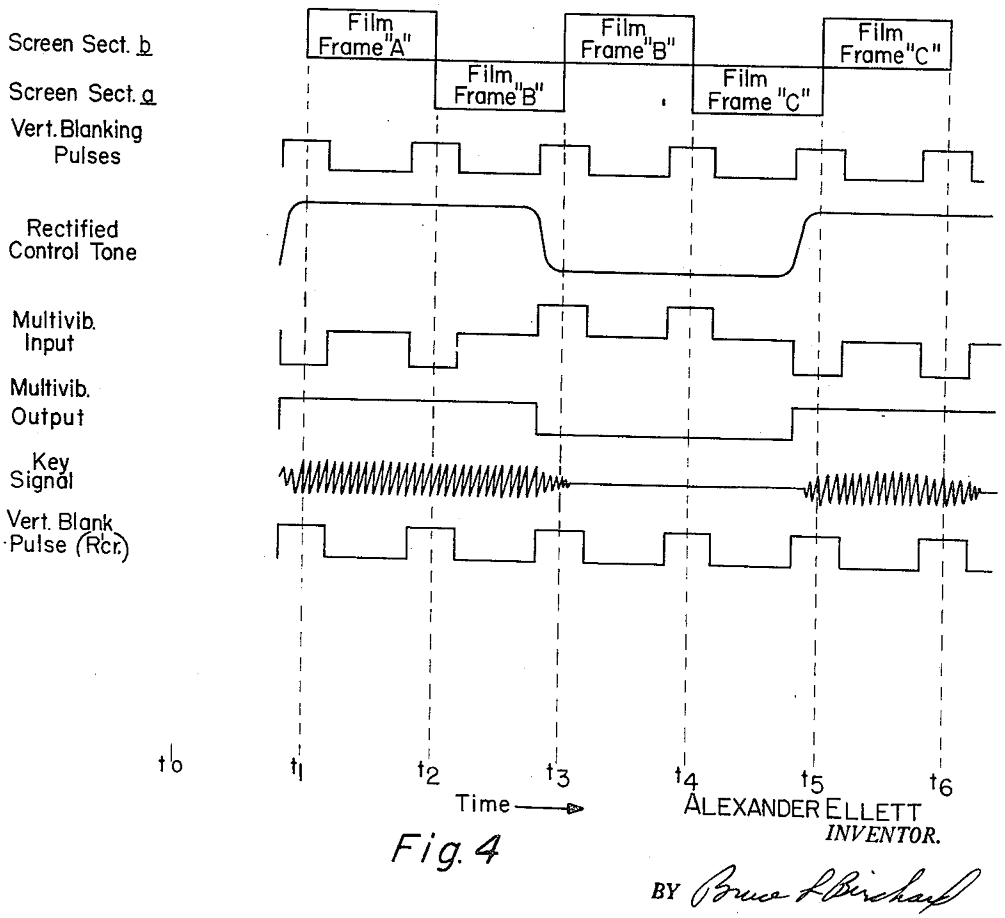
Fig. 4 is a time schedule utilized in explaining the operation of the subscription television system.

When a film such as that represented in Fig. 3 is utilized in the transmitter of Fig. 1, succeeding frames are scanned in double-interlaced fashion as previously described, and as represented by the designated rectangles in the time schedule of Fig. 4. However, the lateral displacement of successive frames causes the time relation of the horizontal-synchronizing components (which precede each line-trace interval) and the video components representing the picture information of the film to change with each frame period. Consequently, the radiated signal is coded and cannot be utilized in conventional manner to produce pleasing pictures at a receiver.

The first two lines of the time schedule of Fig. 4 show operating intervals in which the screen sections *a* and *b* are scanned by the associated electron beams of tube 10 to effect scanning of the film frames. The curve designated vertical blanking pulses shows that a vertical blanking pulse is generated in the synchronizing-signal generator 38 in each of the field retrace intervals which intervene field-scanning periods of the transmitter. At the time $t_1$, for example, a vertical blanking pulse is presented at the field blanking output terminal of generator 38.

The position of the code strip scanning system 55—58 relative to the film gate 25 is represented in Fig. 3. In view of the spacing of that scanner relative to the film gate, at the time $t_1$ the scanning system 55—58 has started scanning the code record of the film frame C to produce at the output terminals of unit 61 the rectified control tone of Fig. 4. The rectified control tone is applied to the input electrode of triode 62 which also receives a vertical blanking pulse over the conductor 69. The coincidence of these potentials renders the tube 62 conductive to translate the vertical blanking pulse through the tube and provide an input pulse of negative polarity to the multivibrator as indicated in Fig. 4. The negative-polarity pulse applied to the multivibrator actuates the multivibrator to initiate the multivibrator output signal of Fig. 4. Since the multivibrator output signal is in the nature of a positive impulse, it is able to turn on the key-signal generator 51 approximately at the time $t_1$.

At the time $t_2$, the tube 10 has completed scanning the screen section *b* and the second field of the frame A and the next succeeding frame B has moved into the film gate into the appropriate position for scanning by the electron beam 13*a* of the tube 10. At this time, the scanning system 55—58 is still reading the code record of the frame C so that once again there is coincidence of a vertical blanking pulse and a rectified output signal from unit 61 present in the input circuit of the tube 62. Accordingly, the multivibrator 73 receives an additional pulse of negative polarity which continues the positive impulse applied from the multivibrator to the key-signal generator, continuing the operation of that generator.

It will be noted in Fig. 3 that the code record of the frame C and similar frames of the film strip terminates before the trailing edge of the frame. Therefore, the control tone supplied to the filter and rectifier 61 from the scanning system 55—58 terminates slightly before the time $t_3$ as indicated in Fig. 4. Therefore, at the time $t_3$, just prior to the scanning of frame B by the electron beam 13*b* of tube 10, the rectified control tone is absent from the input circuit of the tube 62. The absence of the rectified control tone prevents the vertical blanking pulse presented to the tube 62 at the time $t_3$ from overcoming the bias established by the cathode bias network 63—65. As a result, the vertical blanking pulse is not translated by the tube but nevertheless is applied to the multivibrator 73 directly from the resistor 71 and the coupling condenser 72. The operating adjustments of tube 62, preferably, are such that the pulses delivered to the multivibrator have approximately the same amplitude whether they arrive through tube 62 or directly from resistor 71 The pulse applied at the time $t_3$ to the input terminals of the multivibrator is of positive polarity as indicated in Fig. 4 and it changes the operating condition of the multivibrator to initiate at its output circuit a signal which is less positive than that presented during the interval immediately preceding the time $t_3$. The reduced output of the multivibrator turns off the key-signal generator 51. That generator remains off until the operating conditions, previously described as existing at the time $t_1$, reappear.

Specifically, throughout the scanning of the second field of film frame B in the period $t_3-t_4$ and throughout the first field scan of film frame C in the period $t_4-t_5$, the key-signal generator 51 is off. However, at approximately time $t_5$ and during the field-retrace interval immediately preceding the second-field scan of film frame C, the same conditions exist as explained in connection with the time $t_1$, so the generator 51 is turned on again. In other words, this generator is on during an interval that is equivalent to a complete frame period (the total time required to effect two interlaced field scans of the picture strip) and then is off for an equal interval. Consequently, the on-off changes of this generator follow the changes in mode of the film record so that the line signal accurately represents the coding schedule of the coded film.

While the output signal of generator 51 conveys the code information of the scanned film as explained, the on-off changes of this generator occur one field interval before the film scanner 10 begins to scan the film frame having a change in the mode of recording. In particular, from the time schedule of Fig. 4, it is seen that the key-signal generator is turned on and its signal output builds up to its maximum level during the final field scansion of film frame A. The generator remains on during the first field scansion of the immediately succeeding but displaced frame B. It will thereafter be turned off and remain off for the next two succeeding field scansions. This time relation accommodates a delay in the line circuit 50 because that circuit may exhibit a materially greater delay than the ether link over which the television signal is transmitted. So far as the subscriber receiver is concerned, the key signal is permitted the time interval $t_1$, $t_2$ in which to traverse the line circuit.

The final curve in the time schedule of Fig. 4 shows that at the time $t_2$ when the receiver receives a vertical blanking pulse immediately preceding the video portion representing the first field of the displaced film frame B, it has also received the key signal from the line circuit. Decoding equipment at the receiver responds conjointly to the key signal and the vertical blanking pulse to introduce a compensating change in the operation of the receiver to effect decoding of the transmitted composite television signal. Moreover, at the time $t_3$, when the receiver accepts the blanking pulse preceding the second field of the displaced frame B, the key signal is still present to keep the decoding mechanism properly conditioned for image reproduction. However, at the time $t_4$, when the receiver is to reproduce an image of the film frame C, the key signal has died away and the decoding mechanism operates appropriately to utilize the video information representing the film frame C.

A transmitter, such as that represented in Fig. 1, which radiates the coded composite television signal derived by scanning a film in which successive frames are relatively displaced produces an effect that is generally similar to periodically introducing a time delay between the horizontal-synchronizing signals and the line-trace intervals of the composite television signal. In the Roschke application referred to in the earlier portions of this description, a receiver is disclosed for decoding such a transmitted and coded program signal. That receiver may likewise be utilized to reproduce images from the composite television signal originating at the subscription transmitter represented in Fig. 1 of the appended drawing.

Where the transmitter has the conventional frame frequency of 30 cycles per second, corresponding to 60 interlaced fields per second, the maximum coding frequency (the rate at which the time relation between the horizontal-synchronizing signals and the video-trace portions of the composite television signal is varied) is 30 alternations per second. Where it is preferable to have a higher coding frequency, the scanning may be modified by utilizing a single electron beam in tube 10 deflected so that in a given field interval it traverses the entire film gate in a vertical direction. To utilize a single beam of the tube 10, it is only necessary to replace the square-wave generator 37 with biasing potentials which are effective continuously to energize one of the beams of the tube and to extinguish the other. In such a case, the first field trace of the flying spot from unit 10 scans one frame of the film 80 and the succeeding interlaced field is traced on the next frame of the film. This method of interlaced scanning may be employed because very often there is not a material change in picture information from one film frame to the next. When the system is operated in that manner, the continuous strip moves at the field frequency, presenting 60 film frames per second to the film gate. Therefore, it is possible to increase the coding frequency or the number of mode alternations per second.

It will be further understood that continuous movement of the film is not necessary in utilizing the present invention. If desired, the well-known intermittent film drive may be employed and associated with a flying-spot cathode ray tube having a single electron beam that scans each frame of the film, while that film is within the film gate, in either sequential or double interlaced fashion. Moreover, arrangements are also known for accommodating a film prepared for projector use (in which the film speed is 24 frames per second) to television transmitters (in which the frame frequency is 30 per second). Such drives may also be employed with the transmitter represented in Fig. 1. Where an intermittent type of film drive is employed, the code record designated in Fig. 3 may take the form of film portions of varying transparencies. For example, the code record designating a frame in the position of film frame A may be opaque, whereas that designating a displaced frame, such as frame B, may be relatively transparent. With a code record of that composition, the scanning system 55—58 is able to read the code information and control the key-signal generating system properly to apply a key signal to the line circuit 50.

Figure 5:
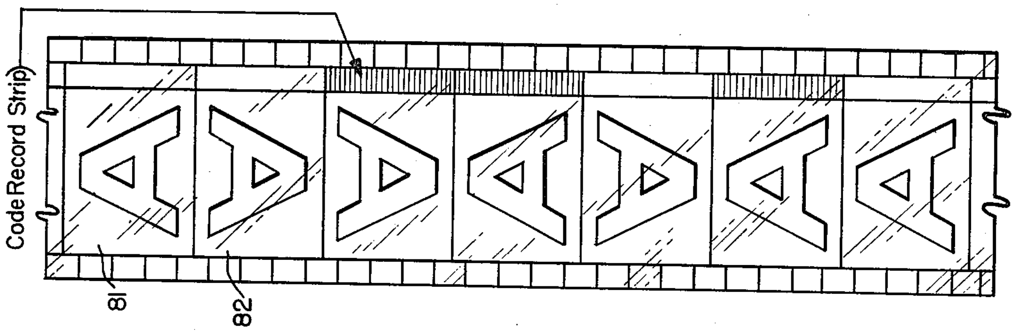
Fig. 5 represents another form of coded film strip which may be utilized in the arrangement of Fig. 1.

A modified form of coded film is represented in Fig. 5 wherein the film comprises a code record strip and a series of picture frames. In this form of coded film, there is no relative lateral displacement of the film frames and coding is accomplished by otherwise modifying the picture information in selected ones of the film frames. For example, the picture information of frame 82 is inverted relative to the information of the preceding frame 81. The inversion may follow a repeating code sequence or it may be entirely random. Other forms of coded films, wherein one series of frames is positive in nature while the other is negative in character or where the picture information may read from left to right in one frame and vice-versa in others, are more completely described in a concurrenly filed application Serial Number 84,968, filed in the name of Alexander Ellett, and assigned to the same assignee as the present invention. The code strip positioned to the right of the series of film frames of Fig. 5 represents the code in accordance with which the inversion of picture information has taken place in processing the film strip. Where the strip has been prepared for use in the transmitter shown in Fig. 1, the code information for any particular film is separated from that particular frame by an intermediate film frame. This space relation of the code information assigned to any given picture frame simplifies the mechanical construction of the transmitter by permitting the code record scanning system 55—58 to be physically displaced from the film gate.

One advantage in the use of a coded film of the type represented in Fig. 5 results from the fact that the film gate may blank out the code record strip so that only the picture information is scanned by the flying spot scanner 10. This precludes the reproduction of the code strip in the images synthesized at the receiver.

The present invention enables any conventional television transmitter of the film scanning type to transmit coded television signals during selected program intervals when it is desired to practice subscription television. The invention is exceedingly useful in that respect since it does not require any modification of the principal components of the television transmitter. They are operated in their normal fashion and the subscription service may be installed merely by the addition of the code-strip scanner or any equivalent device for generating a key signal to be applied to a line circuit, thereby to furnish the appropriate decoding schedule to subscription receivers.

While there has been shown and described one specific embodiment of the present invention, it will be obvious that modifications may be made without departing therefrom. The appended claims are intended to cover any such modifications as fall within the true spirit and scope of the invention.

I claim:

1. A subscription type television transmitter for transmitting coded television signals representing successive frames of a film strip on which program information is recorded in at least two different modes in accordance with a coding schedule comprising: a video-frequency signal generator including a film scanner for scanning successive frames of said film; a scanning-signal generating system for producing synchronizing signals representing the scanning cycles of said film scanner; a mixer amplifier coupled to said video-frequency generator and to said scanning-signal generator for developing a coded composite television signal including video-frequency components and synchronizing-signal components; means for transmitting said composite signal to subscriber receivers over a first signal channel; a key-signal generator; means for controlling said key-signal generator in timed relation to the scanning of said film by said film scanner and in accordance with the coding schedule of said film to produce a key signal having characteristic variations representing the changes in mode of the program information on said film; and means for supplying said key signal to a second signal channel for transmission to subscriber receivers.

2. A subscription type television transmitter for transmitting coded television signals representing successive frames of a film strip on which program information is recorded in at least two different modes in accordance with a coding schedule comprising: a video-frequency signal generator including a film scanner for scanning successive frames of said film; a scanning-signal generating system for producing synchronizing signals representing the scanning cycles of said film scanner; a mixer amplifier coupled to said video-frequency generator and to said scanning-signal generator for developing a coded composite television signal including video-frequency components and synchronizing-signal components; means for transmitting said composite signal to subscriber receivers over a first signal channel; a second scanner for scanning a code record representing the coding schedule of said film in timed relation with the scanning of said film by said film scanner to develop a control signal corresponding to said coding schedule; a key-signal generator responsive to an applied control signal; means coupled to said second scanner for applying said control signal to said key-signal generator to produre a key signal having characteristic variations representing the change in mode of the program information on said film; and means for supplying said key signal to a second signal channel for transmission to subscriber receivers.

3. A subscription type television transmitter for transmitting coded television signals representing successive frames of a film strip on which program information is recorded in at least two different modes in accordance with a coding schedule comprising: a video-frequency signal generator including a film scanner for scanning successive frames of said film; a scanning-signal generating system for producing field-synchronizing signals representing the scanning cycles of said film scanner; a mixer amplifier coupled to said video-frequency generator and to said scanning-signal generator for developing a coded composite television signal including video-frequency components and synchronizing-signal components; means for transmitting said composite signal to subscriber receivers over a first signal channel; a key-signal generator system responsive to an applied control signal; a scanning device for scanning a code record representing the coding schedule of said film in timed relation with the scanning of said film by said film scanner to develop a control signal corresponding to said coding schedule; means for applying said control signal and said field-synchronizing signals to said key-signal generating system to adjust the operation thereof approximately at the start of the scanning of any film frame to produce a key signal having characteristic variations representing the change in mode of the program information on said film; and means for supplying said key signal to a second signal channel for transmission to subscriber receivers.

4. A subscription type television transmitter for transmitting coded television signals representing successive frames of a film strip having program information recorded thereon in at least two different modes in accordance with a coding schedule and having a code strip representing the coding schedule, comprising: a video-frequency signal generator including a film scanner for scanning successive frames of said film; a film driving mechanism for presenting successive film frames to said film scanner; a scanning-signal generating system for producing synchronizing signals representing the scanning cycles of said film scanner; a mixer amplifier coupled to said video-frequency generator and to said scanning-signal generator for developing a coded composite television signal including video-frequency components and synchronizing-signal components; means for transmitting said composite signal to subscriber receivers over a first signal channel; a key signal generating system, including a scanning device for scanning said code strip in timed relation with the scanning of said film by said film scanner, for developing a key signal having characteristic variations representing the change in mode of the program information on said film; and means for supplying said key signal to a second signal channel for transmission to subscriber receivers.

5. A subscription type television transmitter for transmitting coded television signals representing successive frames of a film strip having program information recorded thereon in at least two different modes in accordance with a coding schedule and having a code strip representing the coding schedule, comprising: a video-frequency signal generator including a film scanner for scanning successive frames of said film; a film driving mechanism for presenting successive film frames to said film scanner; a scanning-signal generating system for producing synchronizing signals representing the scanning cycles of said film scanner; a mixer amplifier coupled to said video-frequency generator and to said scanning-signal generator for developing a coded composite television signal including video-frequency components and synchronizing-signal components; means for transmitting said composite signal to subscriber receivers over a first signal channel; a key-signal generator system responsive to an applied control signal; a scanning device for scanning said code strip in timed relation with the scanning of said film by said film scanner to develop a control signal corresponding to said coding schedule; means for applying said control signal to said key-signal generating system to control the operation thereof to produce a key signal having characteristic variations representing the change in mode of the program information on said film; and means for supplying said key signal to a second signal channel for transmission to subscriber receivers.

6. A subscription type television transmitter for transmitting coded television signals representing successive frames of a film strip having program information recorded thereon in at least two different modes in accordance with a coding schedule and having a code strip representing the coding schedule, comprising: a video-frequency signal generator including a film scanner for scanning successive frames of said film; a film driving mechanism for moving said film along a predetermined path to present successive film frames to said film scanner; a scanning-signal generating system for producing synchronizing signals representing the scanning cycles of said film scanner; a mixer amplifier coupled to said video-frequency generator and to said scanning-signal generator for developing a coded composite television signal including video-frequency components and synchronizing-signal components; means for transmitting said composite signal to subscriber receivers over a first signal channel; a key-signal generating system, including a scanning device positioned along said path ahead of said film scanner for scanning said code strip in timed relation with the scanning of said film by said film scanner, for developing a key signal having characteristic variations representing the change in mode of the program information on said film; and means for supplying said key signal to a second signal channel for transmission to subscriber receivers.

7. A subscription type television transmitter for transmitting coded television signals representing successive frames of a film strip having program information recorded thereon in at least two different modes in accordance with a coding schedule and having a code strip representing the coding schedule, comprising: a video-frequency signal generator including a film scanner for scanning successive frames of said film; a film driving mechanism for moving said film along a predetermined path to present successive film frames to said film scanner; a scanning-signal generating system for producing synchronizing signals representing the scanning cycles of said film scanner a mixer amplifier coupled to said video frequency generator and to said scanning-signal generator for developing a coded composite television signal including video-frequency components and synchronizing-signal components; means for transmitting said composite signal to subscriber receivers over a first signal channel; a key-signal generating system, including a scanning device spaced ahead of said film scanner along said path by at least the length of one picture frame of said film for scanning said code strip in timed relation with the scanning of said film by said film scanner, for developing a key signal having characteristic variations representing the change in mode of the program information on said film; and means for supplying said key signal to a second signal channel for transmission to subscriber receivers.

ALEXANDER ELLETT.

REFERENCES CITED

The following references are of record in the file of this patent:

UNITED STATES PATENTS

| Number | Name | Date |
|---|---|---|
| 2,011,737 | Thun | Aug. 20, 1935 |
| 2,226,508 | Clothier et al. | Dec. 24, 1940 |
| 2,251,525 | Rosenthal | Aug. 5, 1941 |
| 2,297,461 | Dillenburger | Sept. 29, 1942 |
| 2,307,728 | Mertz | Jan. 5, 1943 |
| 2,405,252 | Goldsmith | Aug. 6, 1946 |
| 2,414,101 | Hogan | Jan. 14, 1947 |
| 2,429,787 | Young | Oct. 28, 1947 |
| 2,472,774 | Mayle | June 7, 1949 |